United States Patent
Hars et al.

(10) Patent No.: US 9,495,111 B2
(45) Date of Patent: Nov. 15, 2016

(54) SYSTEM AND METHOD FOR REDUCING INFORMATION LEAKAGE FROM MEMORY

(71) Applicant: The Boeing Company, Chicago, IL (US)

(72) Inventors: Laszlo Hars, Lafayette, CO (US); Jeffery Hammond, Pleasanton, CA (US)

(73) Assignee: THE BOEING COMPANY, Chicago, IL (US)

( * ) Notice: Subject to any disclaimer, the term of this patent is extended or adjusted under 35 U.S.C. 154(b) by 96 days.

(21) Appl. No.: 14/511,817

(22) Filed: Oct. 10, 2014

(65) Prior Publication Data

US 2016/0103626 A1   Apr. 14, 2016

(51) Int. Cl.
| | |
|---|---|
| *G06F 12/00* | (2006.01) |
| *G06F 3/06* | (2006.01) |
| *G06F 12/14* | (2006.01) |
| *G06F 21/55* | (2013.01) |
| *G06F 21/79* | (2013.01) |
| *G06F 21/85* | (2013.01) |
| *G09C 1/00* | (2006.01) |
| *H04L 9/00* | (2006.01) |

(52) U.S. Cl.
CPC .......... *G06F 3/0623* (2013.01); *G06F 3/0659* (2013.01); *G06F 3/0673* (2013.01); *G06F 12/14* (2013.01); *G06F 21/556* (2013.01); *G06F 21/79* (2013.01); *G06F 21/85* (2013.01); *G09C 1/00* (2013.01); *H04L 9/002* (2013.01); *G06F 2221/2123* (2013.01); *H04L 2209/08* (2013.01)

(58) Field of Classification Search
CPC ... G06F 3/0623; G06F 3/0659; G06F 3/0673
See application file for complete search history.

(56) References Cited

U.S. PATENT DOCUMENTS

| | | | | |
|---|---|---|---|---|
| 5,123,045 A | * | 6/1992 | Ostrovsky | G06F 12/1408 380/46 |
| 5,729,766 A | | 3/1998 | Cohen | |
| 6,088,452 A | * | 7/2000 | Johnson | G06F 21/14 380/28 |
| 6,633,807 B2 | * | 10/2003 | Augsburger | B60K 31/00 701/115 |
| 8,307,354 B2 | * | 11/2012 | Haga | G06F 21/14 705/57 |
| 8,612,743 B2 | * | 12/2013 | Holland | H04W 12/12 709/223 |
| 8,843,767 B2 | | 9/2014 | Hars et al. | |
| 9,117,094 B2 | * | 8/2015 | Anckaert | G06F 12/1408 |
| 2003/0018608 A1 | * | 1/2003 | Rice | G06F 21/14 |
| 2004/0003278 A1 | * | 1/2004 | Chen | G06F 21/14 726/21 |
| 2008/0189558 A1 | * | 8/2008 | Hughes | H04L 67/1097 713/193 |
| 2010/0106920 A1 | * | 4/2010 | Anckaert | G06F 21/79 711/154 |
| 2013/0117577 A1 | | 5/2013 | Hars et al. | |
| 2016/0026824 A1 | * | 1/2016 | Hars | G06F 12/14 726/26 |
| 2016/0048457 A1 | * | 2/2016 | Hars | G06F 12/14 711/163 |

OTHER PUBLICATIONS

Durvaux, et al., "Cryptanalysis of the CHES 2009/2010 Random Delay Countermeasure," Universite de Louvain, UCL Crypto Group.

(Continued)

*Primary Examiner* — John A Lane

(57) ABSTRACT

A system and method includes a processing unit connected with a memory, the processing unit configured to access data from the memory. A memory transaction unit is added between the processing unit and the memory. The memory transaction unit is configured to perform dummy read- and write-operations at random memory locations at random times and/or insert random delays before real accesses by the processing unit from the memory.

20 Claims, 1 Drawing Sheet

(56) References Cited

OTHER PUBLICATIONS

Nakano et al., "Memory Access Pattern Protection for Resource-constrained Devices," KDDI R&D Laboratories Inc.
Osvik, et al., "Cache Attacks and Countermeasures: the Case of AES (Extended Version) revised Nov. 20, 2005," Dept. of Computer Science and Applied Mathematics, Weizmann Institute of Science, Rehovot 76100, Israel.
European Search Report for EP15174591, Feb. 19, 2016.
Fletchery Christopher W et al: "Suppressing the Oblivious RAM timing channel while making information leakage and program efficiency trade-offs" 2014 IEEE 20th International Symposium on High Performance Computer Architecture (HPCA), IEEE, Feb. 15, 2014, pp. 213-224.
Emil Stefanov et al: "Path ORAM: An Extremely Simple Oblivious RAM Protocol", International Association for Cryptologic Research, vol. 20140114:010337, Jan. 13, 2014, pp. 1-25.
Christopher W. Fletcher et al: "A secure processor architecture for encrypted computation on untrusted programs", Proceedings of the Seventh ACM Workshop on Scalable Trusted Computing. STC 12, Jan. 1, 2012, p. 3.
Moore S et al: "Improving smart card security using self-timed circuits", Proceedings of the International Symposium on Asynchronouscircuits and Systems, XX, XX, Apr. 8, 2002, pp. 211-218.
D Page: "Defending against cache-based side-channel attacks", Information Security Technical Report, vol. 8. No. 1, Mar. 1, 2003, pp. 30-44.

* cited by examiner

SYSTEM AND METHOD FOR REDUCING INFORMATION LEAKAGE FROM MEMORY

FIELD

The systems and methods relate to reducing information leakage from memory access patterns in secure computing.

BACKGROUND

Computer security is information security as applied to computing devices such as computers and smartphones, as well as computer networks such as private and public networks, including the Internet. Computer security can cover the processes and mechanisms by which computer-based equipment, information and services are protected from unintended or unauthorized access, change or destruction. Current secure computing systems are vulnerable to information theft which is performed via analyses of memory access patterns. A simple approach is to add noise to the memory access pattern by adding spurious accesses, e.g., by performing a dummy encryption in parallel to the real one. The noise decreases the signal visible to the attacker, and hence necessitates more samples, but does not eliminate the unintended or unauthorized access.

SUMMARY

According to one aspect, systems and methods can provide for a processing unit connected with a memory, the processing unit configured to access data from the memory. A memory transaction unit connects with the processing unit and the memory. The memory transaction unit is configured to perform dummy read- and write-operations at random memory locations at random times and/or insert random delays before real accesses by the processing unit from the memory.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

Systems and methods are described for improving the security of secure computing systems, e.g., when an adversary tries to gain unrestricted access to the random access memory (RAM) attached to a secure processor. This access may be achieved by a memory bus analyzer that the adversary installs in the target machine for recording information about its memory accesses to the RAM. The recorded data includes the addresses, the transferred data and the time, when the memory access occurred. The systems and method may reduce information leakage from the timing- and address-patterns an adversary observes to help provide a secure computing system.

Figure 1:
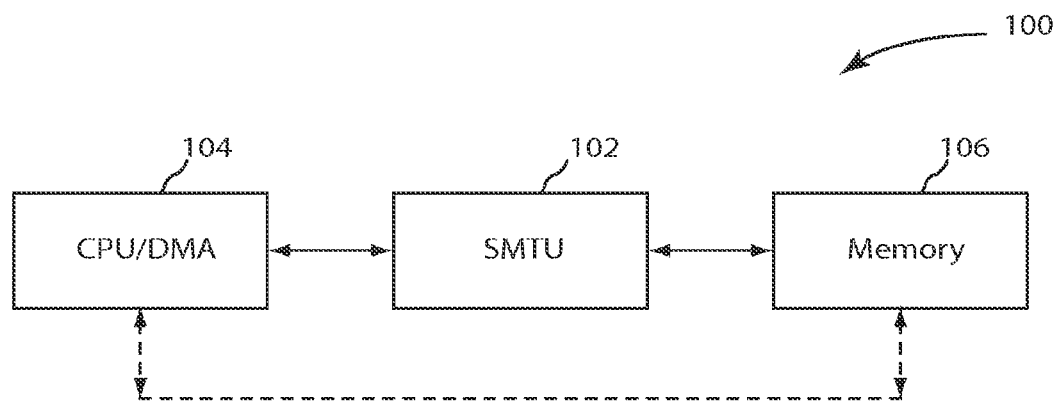
FIG. 1 is a block diagram of an example secure memory transaction unit (SMTU) inserted between a central processing unit (CPU)/direct memory access (DMA) and memory.

FIG. 1 is a block diagram of an example computing system 100, including a secure memory transaction unit (SMTU) 102 positioned between a central processing unit (CPU)/direct memory access (DMA) 104 and a memory 106. An example SMTU 102 is described in commonly assigned U.S. Pat. No. 8,843,767, issued Sep. 23, 2014, entitled SECURE MEMORY TRANSACTION UNIT, which is incorporated in its entirety herewith. The SMTU 102 may be replaced by other memory transaction units that operate as described herein. Computing systems 100 often need external memory 106 (e.g., DRAM, FLASH, ROM, RAM, SSD, magnetic hard disk, etc.) to store long- and short-term used data. To meet security requirements, the data content of the memory 106 is protected. Physical protections may be expensive and unreliable. Therefore cryptographic and algorithmic types of protections are preferred. Adequate secrecy can be provided for a secure microprocessor such as the CPU/DMA 104 by encrypting the data before storing it in the memory 106, and decrypting the data after retrieval using protected circuitry and hidden, high entropy keys for cryptographic algorithms of proven security.

Secure data authentication tags are customarily appended to the encrypted data. They reveal to the CPU/DMA 104 if the stored data has been altered. A residual security problem, however, includes information leak which occurs after encryption and data authentication. The sources of the information leak may be the patterns in memory accesses, characteristic to certain operations the CPU/DMA 104 performs, and to the software, controlling these operations.

The SMTU 102 is added between the CPU/DMA 104 and memory 106 to the computing system 100, which encrypts and authenticates the data stored in memory 106. An attack that produces high information loss may occur by observing memory access patterns when the adversary controls the functionality of among other things the computing system 100, e.g., by providing input, and observes the memory access patterns in reaction to these stimuli. This is often referred to as profiling. The learned knowledge then can be used to gain information from the computing system 100, when it is used in real-life situations. Patterns in memory accesses may reveal to an adversary, among other things, the software versions running in the computing system 100, which may contain known, exploitable bugs; after profiling the functional parts of the software, the actions/function that are performed at any given time; when large lookup tables are used, e.g., at software implementations of ciphers (AES, DES, etc.) cache-miss events, they can reveal bits of the key, in the long run the secret key; and the functions the computing system 100 executes at a given time, etc.

To reduce the data leakage the SMTU 102 may perform dummy read- and write-operations at random memory locations at random times and/or insert random delays before real memory accesses, e.g., which were initiated by the CPU/DMA 104 or input/output (I/O) operations. Dummy read and write operations hide potential memory access patterns. These dummy operations can be performed by the SMTU 102 inserted into the computing system 100 between the memory 104, e.g., an encrypting RAM controller, and the CPU/DMA 104, and/or a software task, running concurrently with the real application. Either way the dummy memory access functionality is transparent to the software running on the computing system 100.

Additionally or alternatively, the dummy memory access countermeasure may be further improved by keeping track of real memory accesses and making dummy accesses to these locations less frequently. In case of lookup tables, the dummy memory accesses are directed to random pages of the lookup table. In hardware implementations a hard coded algorithm may be used to identify if repeated real memory accesses occur to a limited range of memory accesses, and those addresses are then used with higher probability for dummy accesses. In software implementations the program may provide hints to the background dummy memory access task, indicating when lookup tables are processed. This can be in place of the automatic lookup table recognition, or in addition to it. The described countermeasures may work the best when combined with dynamic memory address-remapping, but the security of secure computation improves even without address-remapping.

The dummy memory accesses reduce information leakage both from the addresses of real memory accesses, and their timings. When dynamic address remapping is used in a computing system 100, there is no need for address obfuscation by dummy write operations (only for obfuscating the patterns of memory access timings), but the overall improvement of security due to the SMTU 102 is greater than just hiding the memory access timing information of the computing system 100. The SMTU 102 improves the security of the computing system 100, when access to the memory 106 can be observed and analyzed by an adversary. Computing systems 100 include flight computers, military and space programs, corporate networks, personal and laptop computers, smart mobile devices, etc. When the SMTU 102 is deployed together with traditional cryptographic and algorithmic memory protections, practically all information leaks from memory access patterns can be prevented, and malicious data changes can be detected.

Figure 2:
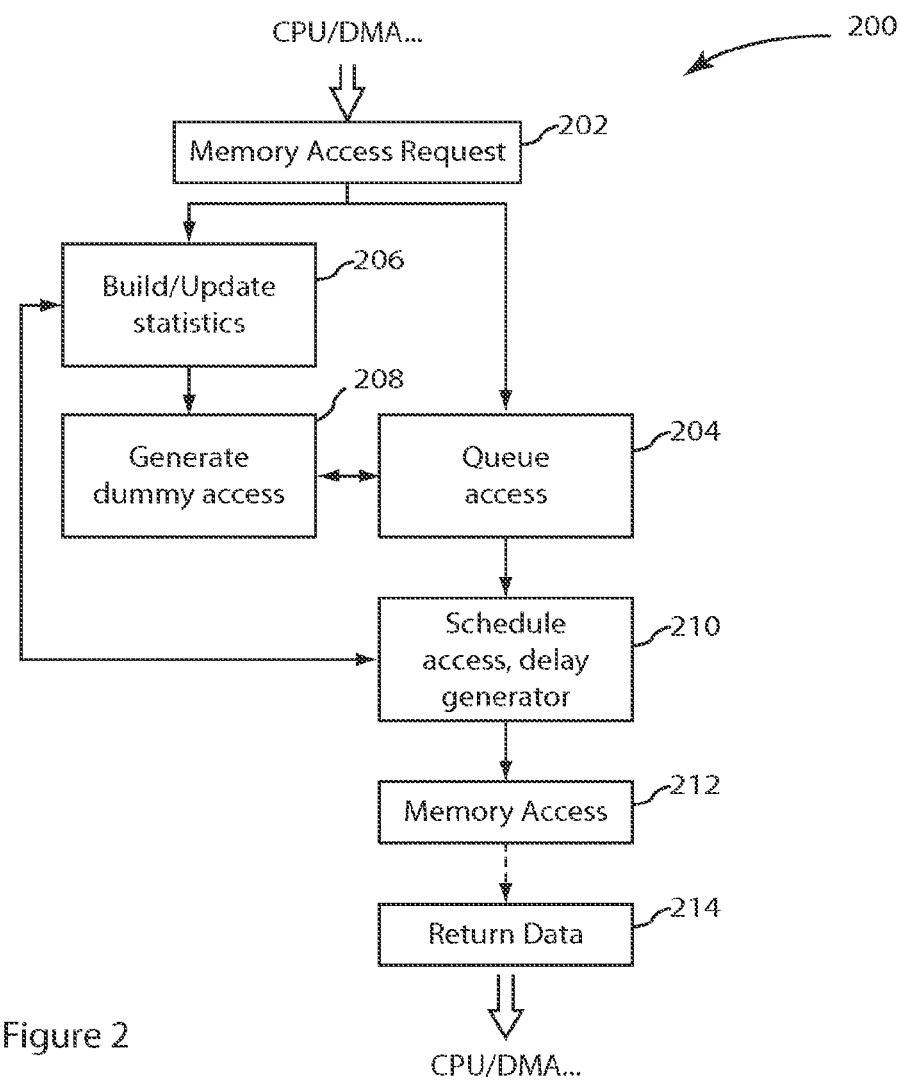
FIG. 2 is a flowchart of an example process for obfuscating memory access patterns.

FIG. 2 is a flowchart of an example process 200 for obfuscating memory access patterns. The CPU/DMA 104 makes an access request of the memory 106 (202). The SMTU 102 provides queue access of the data stored in the memory 106 (204). To accommodate secure queue access, the SMTU 102 builds and updates statistics (206) of real memory accesses. The statistics govern dummy memory access generation to mimic the behavior of the processor or hide the access patterns of the processor, e.g. of an unprotected system. Generating dummy transactions is a way to add noise to the real transactions to obscure any information available with timing analysis of memory transactions. The dummy transactions match what the CPU/DMA 104 naturally does in this environment but is randomized within those constraints. Dummy transactions that do not match normal output patterns may be easily filtered out and therefore not useful in obscuring timing information. The statistics can also be used to govern delays to the real memory accesses.

CPU/DMA 104 interactions with the memory 106 may be accomplished through a cache system of the CPU/DMA 104 so the behavior of the cache system is to be understood. Cache behavior varies between processors so the detailed interactions may be accomplished on a case by case basis. The cache units typically interact with the memory on a cache line basis so this size is understood for each processor to be supported, e.g., by building/updating statistics (206). In general the cache unit operates in two different write modes. One mode is called write-through and the other is usually called copy-back. In write-through mode all writes immediately go to the memory 106 as well as modify cache lines. The write-through writes generate a read-modify-write cycle in the SMTU 102. When copy-back mode is used, the cache lines are modified in real time. When the cache is in copy-back mode, any time there is a cache miss, a cache flush occurs if the cache line to be flushed has received a write. The possible sequences in copy-back mode are cache line flush followed by a cache line read or cache line read only. When the cache is in write-through mode a cache miss only generates a cache line read.

For the sake of efficiency, the cache line size matches the SMTU 102 block sizes. This also makes write-though mode writes through the SMTU 102 appear like cache flush writes obtained when in copy-back mode. Removing this distinction simplifies the effort to obscure timing information. The SMTU 102 schedules access to the memory 106 and delay generator inserts delay as needed (210), as described below. The CPU/DMA 104 accesses the memory 106 (212) and the memory 106 return the data to the CPU/DMA 104 (214). To hide timing information the memory (106) may operate continuously with a fixed pattern of read and write transactions, thereby hiding all timing patterns but at high costs in terms of speed and power use. This pattern takes the form of N reads followed by M writes. The values of N and M are settable parameters chosen with two competing goals in mind. One goal is to hide the fact that dummy memory accesses occur by matching the read and write ratio with the actual usage pattern of the CPU—in case this ratio may be known to an adversary. Another goal is to use these values to obscure the actual ratio of reads and writes—e.g., when reasonably assumed that the adversary does not know this ratio. The SMTU 102 may continuously generate transactions following the pattern using real transaction if available but generating random ones if they are not. For the entire dummy write modes of operations, statistics are maintained for the actual ratio of reads and writes as well as their distribution (number of same types in succession and the address ranges of the memory accesses) (206).

The SMTU 102 protects against at least two types of memory attacks, the one shot attack and the averaging attack. With the one shot attack, for a specific memory address configuration of an algorithm performed in the system an adversary can observe the traffic on the memory bus for one time only. The system behavior is always different; an adversary cannot force the same actions to be performed again. In this situation randomly delayed memory accesses (212) and added dummy memory accesses (208) are effective countermeasures against traffic analyses. This situation occurs at certain applications (mostly real time or communication systems) and when the memory addresses are randomly remapped. In this later case the memory addresses look random to an attacker, and the timing information is obscured by the techniques of delays and dummy accesses. An example of leaks from timing information is when a piece of data (of a program using table lookup) is already in the cache, the system 100 does not load the corresponding page of the table from the memory 106. The absence of the corresponding memory access is identifiable: the regular cache load pattern gets broken.

With an averaging attack, the adversary can force the same actions to be performed repeatedly by the system under attack. For example, the startup memory initialization or a firmware load/decryption process may be repeatable. In this case an averaging process of many observed memory traffic patterns may reveal real memory accesses, while dummy accesses disappear in the noise. In this situation the SMTU 102 detects repeated actions of the system, which can indicate an attack. Upon detecting repetitions the secure computing system may perform specified actions, including erasing keys, clearing storage, sounding alarms or other ways notifying the system administrator about an ongoing attack. The repetition detection subsystem takes a hash of the state of the system at external stimuli (like reset, interrupt) and stores these hash values in protected nonvolatile memory. A large number of repeated hash values indicate an averaging attack.

As described above, the SMTU 102 operates in the context of encrypted and authenticated memory, where the encryption and authentication depends on the data location (address) and on the data version (write counter, time stamp, etc.). Additionally or alternatively to the above description, read memory accesses may be delayed by a random time period, and followed by a write to the same (logical) location, not necessarily immediately, but after a short random delay. In between the data version information gets updated (e.g. a write counter or clock is incremented). Even if the data does not change, the encryption does (being dependent on the data version), so an eavesdropper is not able to tell if the same data, or updated data is written back. The write memory accesses are modified to precede them with a read (only verifying the authenticity of the data, but otherwise not using it if the memory data is not needed, e.g. if it was already in a cache of the CPU/DMA 104). With these two modifications an eavesdropper cannot distinguish memory read and write accesses: they always look the same.

In this way, use of the SMTU 102 is more complex than encryption and data authentication. No dummy algorithms are performed in the CPU (e.g., no dummy encryption), but the memory accesses are randomized. The SMTU 102 does more than just adding random or normalizing delays alone to prevent timing attacks. Introducing random delays only may increase the attack complexity by a linear factor, thus it may not provide adequate security. Rather, the SMTU 102 first inserts dummy memory accesses at random times, and after that may or may not introduce explicit random delays. In contrast to data block remapping obfuscation methods, a history list need not be maintained and dummy data blocks need not be used, which can take up storage space and complicate memory access. The SMTU 102 uses adaptive and more complex algorithms to randomize memory accesses and delays. The SMTU 102 can make dummy accesses to the actual data blocks when it is not accessed by the program. Current access pattern protection schemes access two blocks as the scheme always swaps two blocks between memory regions. The SMTU 102, however, does not need memory swapping regions, and is not restricted to access exactly two data blocks when one is requested. Rather, the SMTU 102 includes an adaptive algorithm that introduces a variable number of dummy accesses to real data. The adaptive algorithm can change as the patterns of real memory accesses change.

The adaptiveness of the SMTU 102 may be used to change its behavior according to the now hidden real memory access patterns. With regard to frequency, dummy memory accesses may be inserted such that the frequency of the overall memory accesses become constant. An extreme case is when 100% of the memory bandwidth is utilized. The constant frequency can be determined off line in a profiling phase of the system 100 while performing typical or security critical tasks, or it can be determined dynamically, e.g. by a moving averaging process. With regard to timing patterns, some algorithms work with varying memory access frequencies. Burst of frequent accesses are separated by quiet periods. The SMTU 102 can identify such patterns and mimic them by inserting dummy bursts of accesses. With regard to address range, image processing, matrix manipulations or table lookup programs (as examples) may access a range of memory often, and access outside of this range mostly sequentially (indicating instruction fetch for the algorithm). The SMTU 102 detects such patterns, and adjusts the dummy accesses accordingly: most of the dummy accesses occur in the limited range (faking access to otherwise irrelevant parts of the image), and occasionally accessing short sequences of consecutive memory locations (for fake program execution). With regard to address sequence, loading program code is often recognizable, linear address sequences get accessed, with jumps to other sequences and interleaved loops. Similar patterns can be easily created of dummy memory accesses, to be injected between real such accesses. This obfuscates the patterns occurring during program execution.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system, comprising:
   a processing unit connected with a memory, the processing unit configured to access data from the memory; and
   a memory transaction unit connected with the processing unit and the memory;
   the memory transaction unit configured to perform dummy memory accesses including at least one of dummy read-operation and write-operation at random memory locations at random times, and wherein the memory transaction unit comprises a delay generator configured to insert delays, before real accesses by the processing unit from the memory.

2. The system of claim 1, where the dummy memory accesses are directed to random pages of a lookup table.

3. The system of claim 1, where the memory transaction unit is further configured to perform dynamic memory address-remapping of the memory.

4. The system of claim 1, where the dummy memory accesses add noise to real memory transactions to obscure information available with timing analysis of the memory transactions.

5. The system of claim 1, where the dummy memory accesses match normal output patterns of the memory.

6. The system of claim 1, wherein the delay generator is configured to select a random time period for the inserted delay, wherein the inserted delay delays a read memory access to a logical location in the memory by the random time period followed by a write memory access to the logical location.

7. The system of claim 6, where the memory transaction unit updates a data version information during the delay even if data does not change.

8. The system of claim 6, where the write memory access is modified to be preceded by the read memory access.

9. The system of claim 1, where the memory transaction unit detects access patterns and adjusts the dummy memory accesses accordingly.

10. The system of claim 1, where the memory operates continuously with a fixed pattern of read and write transactions.

11. The system of claim 1, where the memory transaction unit maintains statistics of real memory accesses.

12. The system of claim 11, where the statistics govern delays to the real memory accesses.

13. The system of claim 11, where the statistics govern delays to the real memory accesses.

14. The system of claim 1, where the memory transaction unit further comprises an adaptive algorithm, where the adaptive algorithm changes as the patterns of real memory accesses change.

15. A method, comprising;
performing dummy memory accesses including at least one of performing a dummy read-operation and a write-operation at random memory locations at random times; and
inserting delays using a delay generator, before real accesses from the memory.

16. The method of claim 15, further comprising directing the dummy memory accesses to random pages of a lookup table.

17. The method of claim 15, further comprising dynamically remapping addresses of the memory.

18. The method of claim 15, where the dummy memory accesses add noise to real memory transactions to obscure information available with timing analysis of the memory transactions.

19. The method of claim 15, where the dummy memory accesses match normal output patterns of the memory.

20. The method of claim 15, where the inserted delay comprises delaying a read memory access to a logical location in the memory by a random time period followed by a write memory access to the logical location.

* * * * *

UNITED STATES PATENT AND TRADEMARK OFFICE
CERTIFICATE OF CORRECTION

PATENT NO. : 9,495,111 B2  
APPLICATION NO. : 14/511817  
DATED : November 15, 2016  
INVENTOR(S) : Laszlo Hars et al.

Page 1 of 1

It is certified that error appears in the above-identified patent and that said Letters Patent is hereby corrected as shown below:

In Column 6, Line 65, in Claim 12, delete "delays to the real memory accesses." and insert -- dummy memory access generation to mimic the behavior of the processor or hide the access patterns of the processor. --, therefor.

Signed and Sealed this  
Thirty-first Day of January, 2017

Michelle K. Lee  
*Director of the United States Patent and Trademark Office*